June 20, 1961    S. A. SCHERBATSKOY    2,989,637
SPECTROMETER

Filed April 26, 1957    3 Sheets-Sheet 1

INVENTOR.
Serge A Scherbatskoy

June 20, 1961 S. A. SCHERBATSKOY 2,989,637
SPECTROMETER
Filed April 26, 1957 3 Sheets-Sheet 2

INVENTOR.
Serge A Scherbatskoy

June 20, 1961  S. A. SCHERBATSKOY  2,989,637
SPECTROMETER

Filed April 26, 1957  3 Sheets-Sheet 3

INVENTOR.
Serge A Scherbatskoy

United States Patent Office 2,989,637
Patented June 20, 1961

2,989,637
SPECTROMETER
Serge A. Scherbatskoy, 804 Wright Bldg., Tulsa 3, Okla.
Filed Apr. 26, 1957, Ser. No. 655,281
10 Claims. (Cl. 250—83.3)

This invention relates to a method of analyzing the spectrum of nuclear radiations such as electrons, alpha rays, gamma rays, and other radiations that may be emitted as a result of various atomic and nuclear processes.

The conventional method of analyzing the spectrum of incident radiation is based on the use of a proportional detector that is adapted to interact with the incident radiation particles, such as electrons or photons, and to produce electrical impulses having magnitudes representing individually the energy of said individual radiation particles. These impulses are subsequently applied to a gate network. The gate network is provided with an upper threshold designated as $a_{max}$, lower threshold designated as $a_{min}$, and a width designated as $a_{max} - a_{min} = \Delta a$. Therefore, the gate network is characterized by two values: (1) the height of the pass band designated as $a = (a_{max} + a_{min})/2$ and representing the average magnitude of an impulse transmitted by the gate, and (2) the width $\Delta a$ of the pass band which represents the range of magnitudes of impulses transmitted through the gate. It is thus apparent that the gate network transmits a relatively narrow range of $\Delta a$ of impulses having mean value $a$. Therefore the rate of occurrence of the impulses transmitted by the gate represents the rate of occurrence of incident radiation particles or quanta that are intercepted by the detector and that have a mean energy and energy width represented by the values $a$ and $\Delta a$.

In the spectrographic analysis as used in the prior art, the parameters of the gate network were continuously varied so that the value $a$ covered all the range of energy values of incident impulses. However, the width $\Delta a$ of the transmitted impulses was maintained constant and independent of value of $a$. For instance, if the instrument was adjusted to pass pulses representing the energy of 100 k.e.v. and the width of 10 k.e.v. then by varying the adjustment, the gate could be adapted to transmit pulses representing the energy of 1 m.e.v., but the width remained the same and equal to 10 k.e.v. Thus in conventional spectrographic measurements, the mean value of the impulses transmitted through a gate represented the energy of measured radiation particles and/or quanta and the width of the gate represented the accuracy of the measured energy. Therefore in the above example, various energy values such as 1 k.e.v., 10 k.e.v., 1 m.e.v., etc. have been measured with the same absolute accuracy of 10 k.e.v. Such an arrangement was, however, very unsatisfactory since in order to be able to compare various widely different energy values such as 50 k.e.v. and 5 m.e.v., one should maintain constant not the absolute accuracy, but the relative accuracy of measurements. Thus if we vary the parameters of the gate network to receive impulses of various magnitudes, and furthermore wish to maintain the relative accuracy of measurements constant during said variation, then the ratio of $\Delta a$ to the value $a$ should be maintained constant for all values of $a$. Consequently, if the instrument is adjusted to pass 100 k.e.v. pulses and the width is 10 k.e.v., then by varying the parameters of the instrument so as to shift the pass band to 1 m.e.v., the width of the pass band will be then 100 k.e.v. Therefore the precision or resolution of energy measurement $\Delta a/a$ will be 10%, and it will remain the same for all values of measured energy.

It is therefore an object of the present invention to provide a method and apparatus for spectroscopic analysis of incident radiation in which the width of the pass band $\Delta a$ is varied in a definite relation to the mean height $a$ of the pass band.

It is another object of this invention to provide a method and apparatus for spectrographic analysis of incident radiation in which the width of the pass band is varied in such a manner as to maintain the value $\Delta a/a$ constant, said value representing the relative accuracy or resolution of the measurement of various energy components of the spectrum of incident radiation.

Other objects and advantages of the present invention will be apparent from the description which follows when taken in connection with the drawing in which.

Figure 1:
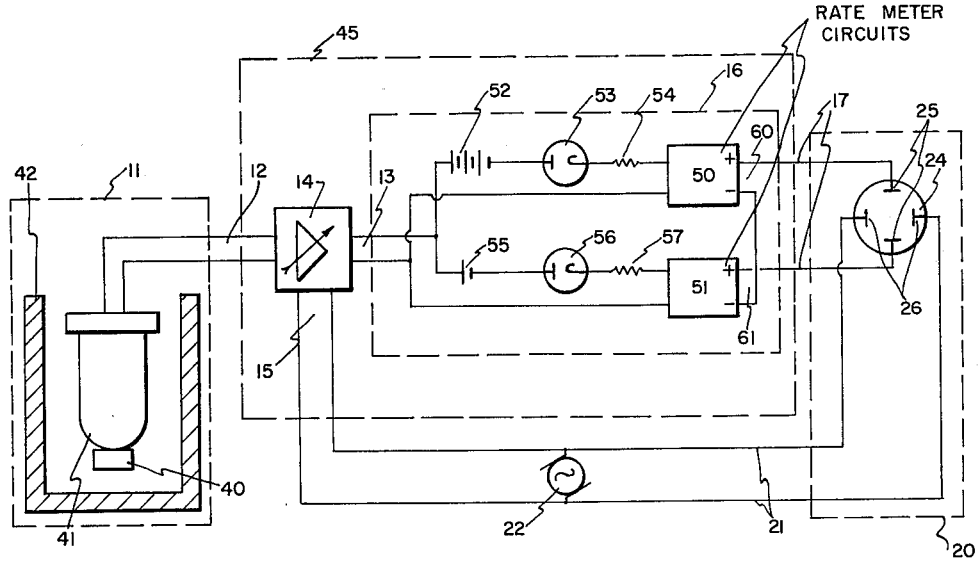
FIG. 1 shows diagrammatically a general arrangement for performing nuclear spectroscopic analysis.

Referring now more particularly to FIG. 1, numeral 10 designates a source of radiation of particles or quanta such as, for instance, photons, alpha, or beta particles or neutrons. These particles or quanta are received by a suitable detector 11 positioned in the proximity of the source. The detector 11 is adapted to interact with the incident radiation and to produce across its output terminals 12 a succession of current impulses having magnitudes representing individually the energies of incident particles or quanta. These impulses are transmitted to a controllable amplifier 14. The amplifier 14 is provided with output terminals 13 and control terminals 15, and is arranged in such a manner that the amplification of the amplifier is varied by varying the voltage at the control terminals 15.

The output leads 13 are in turn applied to an amplitude selective pass band circuit comprised within the dotted lines 16. The circuit is of standard type and is adapted to selectively transmit impulses having a determined mean value A and a determined width $\Delta A$ and to produce across its output terminals 17 a D.C. voltage representing the rate of occurrence of these impulses, said voltage being applied to the input terminals of a recorder. The recorder is provided with two pairs of input terminals, one of said pairs being connected to the leads 17 and the other pair being connected to the output leads 21 of an A.C. generator 22. The generator 22 also supplies the controlling voltage to the leads 15 in order to vary continuously and recurrently the amplification of the amplifier 13. The recorder 20 is adapted to receive two voltages derived from the leads 17 and 21, respectively, and to produce a record of the magnitudes of these voltages. It comprises essentially a cathode ray tube 24 provided with vertical deflecting electrodes 25 and with horizontal deflecting electrodes 26. The voltage output from the pass band circuit 16 is applied through leads 17 to the vertical deflecting electrodes 25 and the voltage from the A.C. generator 22 is applied through leads 21 to the horizontal deflecting electrodes 26. The cathode ray tube is adapted to provide a visual representation of the spectral composition of photons, alpha, and beta particles radiated by the source 10.

The detector 11 is commonly known as a scintillation detector and comprises a crystal 40 of sodium iodide, anthracene, cadmium tungstate, hydrogenous scintillating plastic (for proton recoil measurement of neutrons), or any other suitable substance possessing the property of scintillating when subject to incident radiation. The crystal 40 is sufficiently large so as to obsorb substantially completely any incident particle or photon. The selection of the crystal 40 depends to a very large extent upon the type of radiation studied. Therefore, if we wish to analyze the spectrum of gamma radiation emitted by the source 10, then the crystal should be adapted to respond to photons and not to respond to alpha and beta rays. In order to accomplish this purpose, we choose a crystal 40 of sodium iodide and provide around the crystal 40 and photomultiplier 41 associated with the crystal a suitable shield 42, said shield being adapted to absorb any beta and alpha particles that may be emitted by the source 10. The crystal 40 is of sufficient size so as to absorb substantially completely any incident photon, and, therefore, the intensity of a light impulse produced within the crystal as a result of absorption of a photon represent the energy of said photon. These light impulses are applied to the photomultiplier 41 that is suitably coupled to the crystal 40 and is adapted to produce across the terminals 12 current impulses representing the energies of incident photons.

Figure 2:
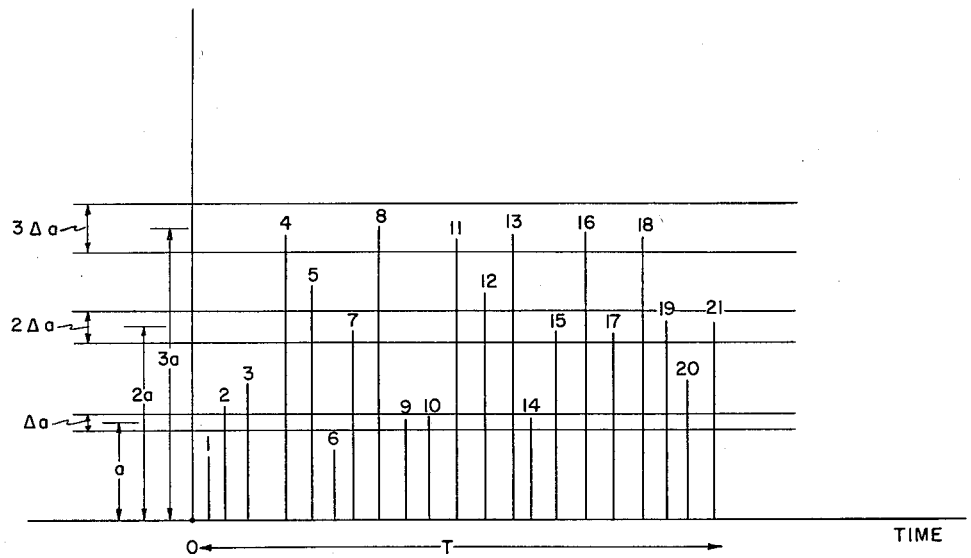
FIG. 2 shows diagrammatically the output of a radiation pulse detector in which the axis of abscissas represents the time of occurrence of the pulses and the ordinates represent their respective magnitudes.

The electrical impulses derived from the output of the detector 11 are substantially of the form designated by numbers 1 to 21 in FIG. 2. They occur in succession and having magnitudes that respectively represent the energies of the corresponding particles.

The principle of the method consists in selecting a determined time interval T and considering during this time interval only a portion of the impulses derived from the output of the detector 11 and namely impulses that represent a narrow energy range of the incoming particles. Assume that the impulses that are transmitted have a mean value $a$ and with $\Delta a$. Consequently, those impulses in FIG. 2 that are larger than $(a-\Delta a/2)$ and smaller than $(a+\Delta a/2)$ are located within the selected energy range. Let the number of impulses within this range be $n$. From the inspection of FIG. 2 it is apparent that the impulses 9, 10, and 14 are within the range and consequently assuming that T represents the time of measurement, we have $n=3$ for impulse having magnitude $a$ and characterized by a relative range $(\Delta a/a)=K$. It is the purpose of this invention to vary continuously the value $a$, but at the same time to maintain the relative range K constant. For instance, if the average magnitude of the impulses that are selectively transmitted through the gate 15 has doubled, i.e. it corresponds to $2a$ in FIG. 2, then the width of the received impulses should also double and have the value $2\Delta a$. Under these conditions, the impulses having average value $2a$ and relative range K, are comprised within the absolute range $2\Delta a$. These impulses are larger than $2a-(2\Delta a/2)$ and smaller than $2a+(2\Delta a/2)$. Referring now to FIG. 2, it is seen that these impulses are as follows: 7, 15, 17, 19, 21, and consequently $n=5$. Similarly, when the average magnitude of impulses that are selectively transmitted through the gate 15 has tripled, i.e. it corresponds to $3a$ shown in FIG. 2, then the width of transmitted impulses should also triple and have the value $3\Delta a$. Under these conditions, the impulses having average value $3a$ and relative range K are comprised within the absolute range $3\Delta a$. These impulses are larger than $3a-(3\Delta a/2)$ and are smaller than $3a+(3\Delta a/2)$. Referring now to FIG. 2, it is shown that they are identified as follows: 4, 8, 11, 13, 16, 18, and consequently $n=6$.

The above illustration is based upon the assumption that the total number of impulses during the interval of a single measurement is $n=21$. In actual practice, however, the number of impulses is considerably larger so that in measurement of various values of $n$ the errors due to statistical fluctuations can be neglected.

Referring now again to FIG. 1, we have included a portion of the circuit comprising the variable amplifier 14 and the pass band circuit in a dotted rectangle 45, said rectangle 45 being designated hereafter as variable gate. The variable gate 45 is provided with input terminals 12, output terminals 17, control terminals 15, and is adapted to transmit selectively the pulses applied to the terminals 12 in accordance with their magnitude. The position and effective width of the pass band of the gate is controlled by the voltage applied across the control terminals 15 in a manner hereafter described. It should be noted that $a$ and $\Delta a$ are variable quantities that are associated with pulses obtained across the leads 12, whereas A and $\Delta A$ are fixed quantities that are associated with the characteristics of the pass band circuit 16. Namely, A represents the fixed average magnitude of the pulses that are transmitted through the circuit 16 and $\Delta A$ represents the fixed value of the width of said transmission band.

Figure 3:
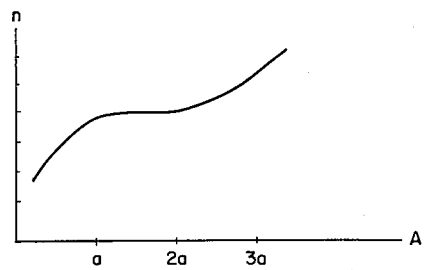
FIG. 3 shows diagrammatically an energy spectrum of incident radiation obtained by means of the instrument of FIG. 1.

This invention consists essentially in varying the position of the transmission band of the gate network 45 by means of the control voltage applied to the leads 15 so as to selectively transmit various ranges of amplitudes. Thus if $a$ is the average value of the transmitted pulses for a given setting of the gate network 45 and $\Delta a$ is the corresponding value of the pass band, then by varying the control voltage at the leads 15, we vary the pass band position and width of the gate network as a result of which both the values $a$ and $\Delta a$ vary. However, in this particular case we have $\Delta a = Ka$, i.e. the width of the band is proportional to the average value of the impulses transmitted by the gate. Referring now again to FIG. 2, if we plot all the values of $a$ along the axis of abscissas and the corresponding values of $n$ along the axis of ordinates, we obtain a diagrammatic representation similar to the one shown in FIG. 3. It is apparent that each abscissa value represents the magnitude of energy $a$ within a range of width $\Delta a$. Consequently, the abscissas are measured in units of energy such as electron volts. On the other hand, each value of the ordinate represents the number of impulses per unit of time, said impulses being within the energy range from $a-(\Delta a/2)$ to $a+(\Delta a/2)$. Consequently, the diagram of FIG. 3 represents schematically the energy distribution of the photons incident on the detector 11.

An essential feature of this invention consists in providing across the output leads 12 of the detector a controllable amplifier 14, and applying the output leads 13 of the amplifier to a fixed pass band circuit 16 characterized by a fixed upper threshold value $A+(\Delta A/2)$ and a fixed lower threshold value $A-(\Delta A/2)$ and adapted to transmit only those impulses that are between said threshold values. Assume that the amplification of the amplifier 14 has been adjusted to have a certain fixed value $m$.

The impulses across the leads 12 have magnitudes $a$, said value covering the relatively wide range of all energies of the incident photons. It is apparent that each impulse having the value $a$ at the leads 12 will cause an amplified impulse to appear across the leads 13, said amplified impulse having the value $am$. Thus we obtain across the leads 13 impulses having values $am$ and covering a very wide range of magnitudes which is $m$ times larger than the range of impulses applied to the leads 12. However, a very small portion of these amplified impulses can be transmitted through the pass band network 16, and namely only those impulses that have an average value A and width $\Delta A$. Under these conditions, only a very small portion of impulses derived from the leads 12 is transmitted through the gate 45, i.e. only those impulses that have an average value $a=A/m$ and the width $\Delta a=\Delta A/m$. These pulses produce across the output terminals 17 of the gate network 45 a D.C. voltage representing their rate of occurrence. It should be noted that the values A and ΔA are fixed and determined by the parameters of the pass band circuit 16 and these parameters do not undergo any changes during the measuring process. On the other hand, the amplification $m$ of the amplifier 14 is varied continuously by means of the control voltage across the leads 15 in a manner described hereafter. It is thus apparent that both $a$ and $\Delta a$ are inversely proportional to the amplification $m$, and by controlling the amplification of the amplifier 14 so as to scan a predetermined range of values of $m$, we effectively scan various amplitude ranges determined by $a=A/m$ and $\Delta a=\Delta A/m$ of the pulses obtained across the leads 13.

Assume, for instance, that the amplification of the amplifier 14 has been adjusted to a lower value, i.e. to $\frac{1}{2}m$, representing half of the amplification previously used. Under these conditions the pulses obtained from the leads 12 that have twice the value previously used, i.e. $2a$, and twice the previous width, i.e. $2\Delta a$ will appear across the output leads 13 as pulses having magnitude A and width ΔA. These pulses will be transmitted through the pass band circuit 16 and we obtain across the output terminals 17 a D.C. voltage representing the rate of occurrence of pulses having average magnitude $2a$ and width $2\Delta a$.

In a similar manner, if the amplification of the amplifier 14 has been adjusted to a value that is S times the value originally used, where S is any desired number larger or smaller than one, then the pulses appearing across the leads 12 having magnitudes $Sa$ and width $S\Delta a$ will have after amplification the desired value A and width ΔA which make them suitable for transmission through the pass band circuit 16.

It is therefore apparent that this invention is characterized by a variable amplifier 14 and by a fixed pass band circuit 16. The scanning process is effected by varying the amplification of the amplifier, thereby admitting into the fixed pass band various amplitudes of impulses occurring at the terminals 12. Since the value of the impulses transmitted through the pass band circuit 16 is A and width ΔA, and since the variable amplification of the amplifier 14 has been designated as $m$, the range of impulses derived from the terminals 12 and transmitted through the pass band circuit 16 is $A/m$, and the corresponding width is $\Delta A/m$. By varying continuously the value $m$, we effect a continuous scanning of all the energy values of the incident photons or particles.

Consider now more in detail the pass band circuit 16 shown in Fig. 1. In order to obtain a signal representing the rate of occurrence of pulses having magnitudes larger than $A-(\Delta A/2)$ and smaller than $A+(\Delta A/2)$, the following instrumental steps are necessary:

(1) Apply the pulses derived from the leads 13 to a channel A that transmits only those impulses that are larger than $A+(\Delta A/2)$ and determine the number $N_1$ of impulses thus transmitted per unit of time.

(2) Simultaneously with the step (1), apply the pulses derived from the leads 13 to a channel B that will transmit only those impulses that are larger than $A-(\Delta A/2)$ and determine the number $N_2$ of impulses thus transmitted per unit of time.

(3) Subtract the value $N_1$ from the value $N_2$, i.e. determine $n=N_2-N_1$.

As shown in FIG. 1, the electrical impulses derived from the leads 14 are applied to the channels A and B. These channels individually connect the output leads 13 with two rate meter circuits 50 and 51, respectively. In particular, the channel A connects the leads 13 to the rate meter circuit 50 and the channel B connects the leads 13 to the rate meter circuit 51.

The channel A comprises a battery 52 in series with a rectifier 53 and resistor 54 interposed between one of the leads 13 and one of the input leads of the rate meter circuit 50. Let the voltage of the battery 52 be $E=A+(\Delta A/2)$. This voltage is arranged to oppose the voltage impulses derived from the leads 13 and therefore only those impulses that are larger than $E_1=(A+\Delta A/2)$ are transmitted through the channel A and applied to the rate meter circuit 50.

The channel B comprises a battery 55 in series with a rectifier 56 and a resistor 57 interposed between one of the leads 13 and one of the input leads of the rate meter circuit 51. Let the voltage of the battery 55 be $E_2=A-(\Delta A/2)$. This voltage is arranged to oppose the voltage impulses derived from the leads 13 and therefore only those impulses that are larger than $E_2=A-(\Delta A/2)$ are transmitted through the channel B and applied to the rate meter circuit 51.

The rate meter circuits 50 and 51 are of standard construction and are adapted to produce across their output terminals 60 and 61, respectively, D.C. voltages that represent the rate of occurrence of impulses that exceed the threshold values $A_1+(\Delta A/2)$ and $A-(\Delta A/2)$, respectively. The outputs of the rate meter circuits 50 and 51 are connected in opposition, i.e. the negative terminal 60 has the same polarity as the negative terminal 61. Consequently, the difference of voltages between the leads 60 and 61 is applied to the leads 17 and it represents the frequency of occurrence of impulses derived from leads 13 and having magnitudes larger than $A-(\Delta A/2)$ and smaller than $A+(\Delta A/2)$. The voltage derived from the leads 17 is applied to the vertically deflecting plates 25 of the cathode ray oscillograph 24 (or to a recording oscillograph or recorder) and causes a deflection by an amount representative of the intensity of photon or particle flux between the energy values determined by the voltage across leads 21.

(In FIG. 1 it is sometimes convenient, especially for low counting rates to replace the two rate meters 50 and 51 by an anticoincidence circuit and a single rate meter. In this arrangement, the anticoincidence circuit's two inputs are connected to the tubes 53 and 56 and the anticoincidence circuit output is connected to a single rate meter, the output of which in turn is connected to the leads 17.)

Because of the varying voltage of the source 22, a scanning process takes place which causes the voltage applied to the control terminals 15 to vary in magnitude and to vary the amplification $m$ of the amplifier 14. As explained above, the value of $m$ determines the range of impulses transmitted through the gate 45. By varying continuously the value $m$, we effect a continuous scanning of all the energy values of the incident photons or particles. During the scanning the voltage derived from the leads 17 and applied to the oscillograph 24 represents at any instant the frequency of occurrence of impulses within the transmission range. Thus the deflection produced on the oscillograph is by the amount representing the ordinate of the curve of FIG. 3, i.e. the intensity of the energy component.

It is apparent that there exists a unique correspondence between the value $m$ designating the amplification of the amplifier 14 and the value $a$ designating the average magnitude of impulses transmitted through the gate network 45, and therefore by varying $m$ so as to scan a determined range of magnitude, we simultaneously vary the value $a$. During this variation, the width is automatically also varied so as to maintain the relationship $\Delta a/a$ constant. It is also apparent that each value of the control voltage derived from the source 22 determines a corresponding value of $m$ and of $a$, and therefore the voltage across the leads 21 can be used as a measure of the value $a$. This voltage is applied to the horizontal deflecting electrodes 26 of the oscillograph 24 and represents at any instant the height $a$ of the pass band of impulses derived from the leads 12. This voltage represents also the energy of the individual photons or particles, and consequently it represents the values of abscissas in the diagram of FIG. 3, since these values correspond to energies. On the other hand, the voltage applied to the vertically deflecting electrodes 25 of the oscillograph represents at any time the number of particles per second, i.e. the intensity of radiation within the corresponding energy ranges. Consequently, in the diagrammatic representation of FIG. 3, the voltage applied to the electrodes 25 represents the values of the ordinates since these values correspond to intensities of various radiation components. During the process of scanning described above, these two voltages vary simultaneously, thereby causing the oscillograph to produce a curve such as shown in FIG. 3 and representing the energy spectrum of radiation impinging on the detector 11.

Figure 1A:
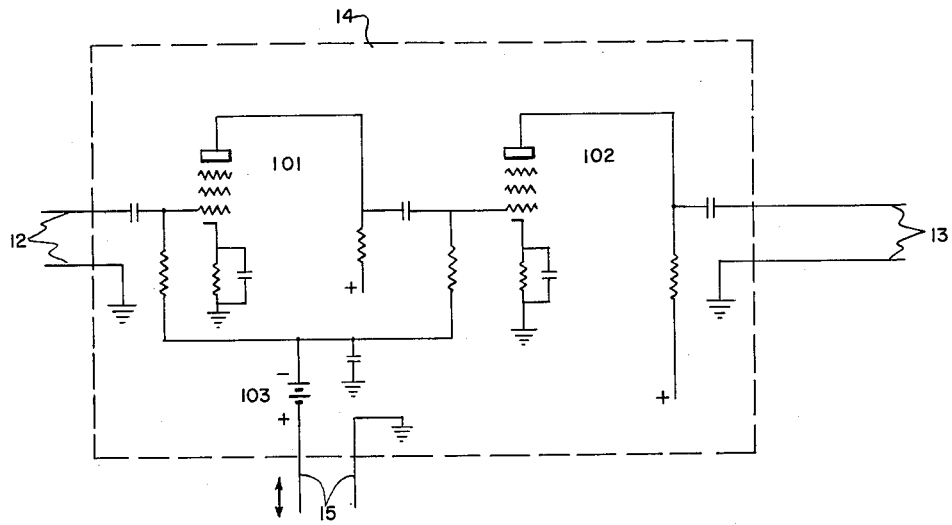
FIG. 1a shows more in detail a controllable amplifier comprised in the arrangement of FIG. 1.

FIG. 1a shows in detail the variable amplification amplifier designated as block 14 of FIG. 1. Numeral 12 designates the input terminals, and numeral 13 designates the output terminals. The operation is as follows: Vacuum tubes 101, 102 are of the "variable mu" type; i.e. their amplification can be varied by varying the bias voltage of the control grid. Numerals 15 designate the control terminals and it is seen that the control grid bias voltage of tubes 101, 102 can be varied by varying the voltage applied to terminals 15. The circuits supplying voltages to the screen grids, suppressors, heaters, etc., are not shown for reasons of simplicity, since they are well known in the art. The operation is as follows: When the voltage supplied from generator 22 of FIG. 1 has the maximum positive instantaneous value, for example, $+e_1$, the circuit is arranged so that the battery 103 balances this voltage; i.e. the battery 103 has a voltage equal to $e_1$. For this condition, where $+e_1$ supplied by the generator 22 is counterbalanced by the voltage $-e_1$ of battery 103, the bias on the control grids of tubes 101, 102 is equal to zero. As the instantaneous voltage of the generator 22 varies and reaches the maximum negative value of $-e_1$, the bias voltage on the control grids of tubes 101, 102 correspondingly reaches a value of $-2e_1$. Because of the well known behavior of variable mu tubes, this negative voltage on the control grids of tubes 101, 102 causes a reduction in the amplification of these tubes. As the instantaneous value of the voltage generated by generator 22 varies from the value $+e_1$ to $-e_1$, the control grid voltage of tubes 101, 102 varies from the value zero to $-2e_1$, and thus intermediate values of the voltage generated by generator 22 cause the control grids to receive corresponding intermediate values of bias voltage, and have corresponding intermediate values of amplification.

Figure 4:
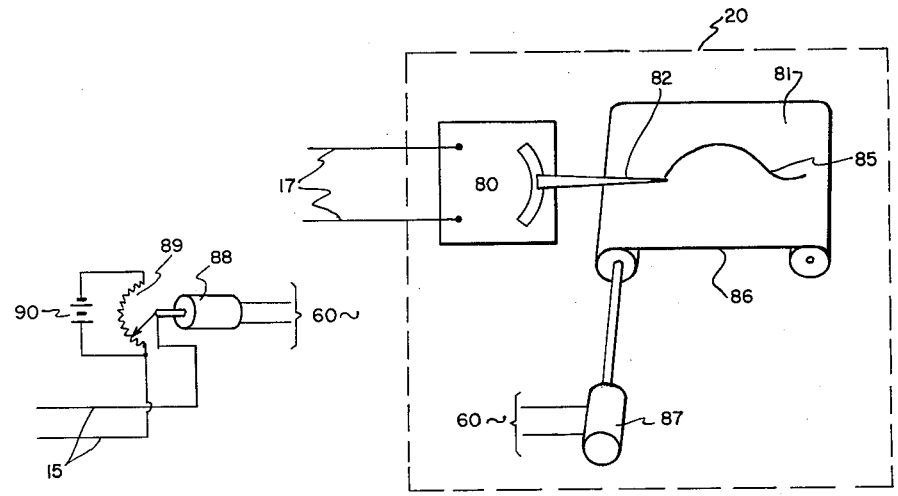
FIG. 4 shows in another form a recording means to be used in the instrument of FIG. 1.

FIG. 4 represents a modified form of the recorder 20 of FIG. 1. As shown in the FIG. 4, the output voltage derived from leads 17 is applied to the pen drive unit 80 of a suitable graphical recorder that includes the chart paper 81, on which the pen 82 traces a graphical representation of the voltage derived from leads 17. The graph 85 indicates the variation of the signal with the progress time. The chart 86 is driven by synchronous motor 87 which is energized by the 60~ power of the mains. The generator 22 of FIG. 1 is replaced in FIG. 4 by a motor-driven potentiometer. The 60~ synchronous motor 88 drives potentiometer 89 so that a fraction of the voltage of battery 90 is impressed on the leads 15. Since motors 87 and 88 are both synchronous and are connected to the 60~ mains, the movements of the chart 86 and potentiometer 89 are exactly synchronous, and as the potentiometer travels and produces a voltage from zero to maximum across wires 15, the chart 86 travels a corresponding distance in the recorder 20, and thus it is in a definite relationship to the variation of the amplitude $a$ of the impulses transmitted through the gate 45. At the same time the pen 82 moves in a definite relationship to the rate of occurrence of the impulses having average value $a$ and width $\Delta a$. Consequently the trace 85 represents the functional relationship between said rate of occurrence and the value $a$.

It is apparent that I have provided a spectrometer for analyzing incident radiations which comprises a variable pass band system characterized by a height A and width $\Delta A$, in which $\Delta A$ is arranged to be proportional to A, i.e. $\Delta A = KA$ where K is a coefficient of proportionality, and is determined by the voltages provided by the batteries 52 and 55 in FIG. 1. If $E_1$ designates the voltage of the battery 52 and $E_2$ is the voltage of the battery 56, then the pulses transmitted through the gate will be larger than $E_2$ and smaller than $E_1$. Therefore, the average height of the pass band is $(E_1+E_2)/2 = A$ and the width of the pass band is $E_1-E_2 = \Delta A$. Thus the constant of proportionality representing the ratio of the width to the height, i.e.

$$K = \frac{2(E_1 - E_2)}{E_1 + E_2}$$

is maintained constant during the scanning process and is determined by the voltages of the batteries 52 and 55.

Figure 5:
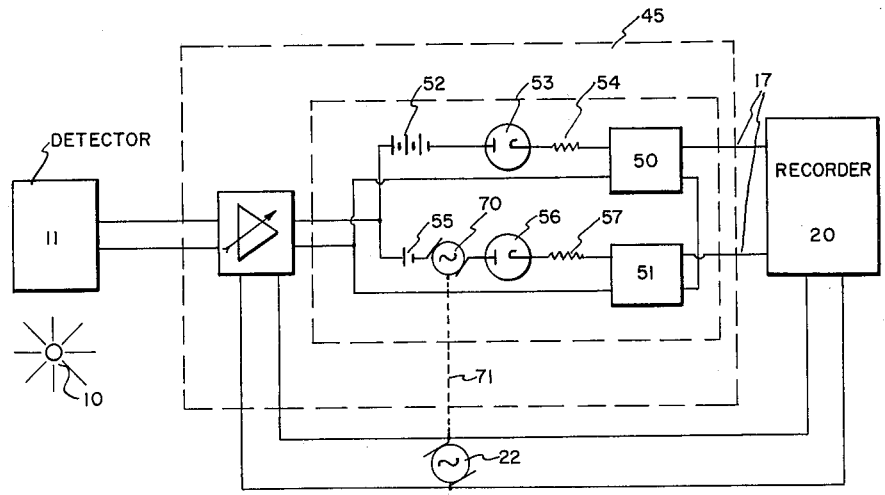
FIG. 5 shows a modified form of the variable gate to be used in the instrument of FIG. 1, in which the width of the band is arranged to be varied in accordance with a predetermined program.

FIG. 5 shows a modified embodiment of the gate network 45 in which I have provided a great flexibility in the variation of the band width $\Delta A$ as a function of the value A. The gate network 45 in FIG. 1 is so arranged as to provide a functional dependence between $\Delta a$ and $a$ of the form $\Delta a = Ka$, whereas the gate network 45 in FIG. 5 is arranged to provide a more general functional dependence. The gate network shown in FIG. 5 is very similar to the gate network shown in FIG. 1 and similar elements have been designated by the same numerals in both figures. It should be noted, however, that the channel B shown in FIG. 1 comprises battery 52 in series with a rectifier 56 and a resistor 57, whereas the channel B shown in FIG. 5 comprises battery 55 in series with a variable source of voltage 70, rectifier 56, and resistor 57. The source 70 may be in form of an A.C. generator driven by the same shaft 71 and synchronously with the source 22 or may be a synchronous motor-driven potentiometer and battery. Let $E_1$ be the voltage of the battery 52, $E_2$ be the voltage of the battery 55 and let $E_3 \sin \omega t$ be the voltage of the source 70. It is apparent that the channel A comprising the battery 52, rectifier 53, and resistor 54 will transmit those impulses that exceed in magnitude the voltage of the battery and therefore the channel A is characterized by a fixed threshold $E_1$. On the other hand, the pulses transmitted through the channel B have to overcome the voltage of the battery 56 and the voltage of the source 70, and therefore this channel is characterized by a threshold that varies with time and is equal to $E_1+E_3 \sin \omega t$. The pulses transmitted through channels A and B are applied to rate metering networks 50 and 51, respectively, said networks indicating across their output leads the frequency of occurrence of pulses that are transmitted through the channels A and B, respectively. The outputs of the rate metering networks 50 and 51 are connected in opposition and therefore we obtain across the leads 17 a D.C. voltage representing the frequency of occurrence of those impulses that are smaller than $E_1$ and that are larger than $E_2+E_3 \sin \omega t$. It is thus apparent that the pass band transmitted through the gate network 45 varies with time. The height of the pass band is $$A = (E_1 + E_2 + E_3 \sin \omega t)/2$$

and the width of the pass band is $$\Delta A = (E_2 + E_3 \sin \omega t - E_1)$$

Therefore, in this particular embodiment the factor of proportionality representing the ratio of the width to the height is:

$$K = \frac{2(E_2 + E_3 \sin \omega t - E_1)}{E_1 + E_2 + E_3 \sin \omega t}$$

and varies during the scanning process. This variation can be determined in advance by properly choosing the values $E_1$, $E_2$, and $E_3$. In some instances we may find it desirable to use an A.C. generator that will produce several harmonics in addition to the fundamental frequency, i.e. the voltage of this source may be represented not by $E_3 \sin \omega t$, but by an expression $$E_3 \sin \omega t + E_4 \sin 2\omega t + E_5 \sin 3\omega t + \ldots$$

in which the values $E_4$ and $E_5$, etc. are so chosen as to represent any preassigned wave form.

It is apparent that by varying continuously the amplification $m$ of the amplifier 14 by means of the generator 22, we effect a continuous scanning of all the energy values of the incident photons. Furthermore, it should be noted that the voltage of the source 70 is varied in synchronism with the source 22 and therefore the width of the band of the impulses transmitted through the gate 45 is varied in synchronism with the height of this band.

It is apparent that in cases of strong radiation the system using the oscillograph as shown in FIG. 1 is the most convenient and that in cases of weak radiation the scanning operation is best performed in a single slow sweep as shown in FIG. 4. The arrangement involves the synchronous motor-driven potentiometer and battery combination that generates a voltage (applied to terminals 15) that would constantly increase from the value zero to a maximum value in accordance with a linear or logarithmic time law, or from the value $-e_1$ to the value $+e_1$, according to a linear or logarithmic time law. The presentation of the data would be on the graphic recorder of FIG. 4 which is of the strip chart variety in which the paper is driven by a synchronous motor and moves a convenient number of inches during the scanning time interval, during which the voltage impressed on terminals 15 sweeps through a complete scan. Since the two motors 87 and 88 are both of the synchronous type, positive lock-in between the movement of the chart paper of the recorder and the instantaneous value of the voltage at terminals 15 is assured. Furthermore, the generator 70 of FIG. 5 can also be a synchronous motor-driven potentiometer and battery combination and the potentiometer can be designed to provide a voltage variation having any desired law of variation with respect to angular displacement.

When I use the term "particle" or the term "ray" in the specification and claims hereof, I refer to and intend to include any member of the entire class which comprises photons, electrons, protons, neutrons, alpha particles, and all other elementary particles.

The scintillation counter designated by numeral 11 in FIG. 1 is of standard construction and such scintillation counters are well known in the art. It comprises a scintillating body 40, a photomultiplier 41, and a high voltage power supply which, for reasons of simplicity, is not illustrated in the figure, but is assumed to be included in the block above the photomultiplier. Furthermore, it is understood that this invention is not limited to use with scintillation counters, but can be used with any type of proportional counter, as, for example, proportional ionization chamber, crystal counter, conduction counter, or any other type of counter which produces output pulses, the magnitude of which have a relationship to the energy of the impinging particles or rays.

I claim:

1. In an instrument for analyzing radiation consisting of individual rays succeeding each other, said rays having different energy values, a detector responsive to said radiation for producing a succession of pulses coincident with said rays and having magnitudes representing the respective energies of said rays, a variable amplitude selective network connected to said detector for selectively transmitting pulses in a definite relation to their amplitudes and an indicator connected to said amplitude selective network, said amplitude selective network comprising an amplifier of variable amplification connected to the output of said detector and a pulse discriminating network for selectively transmitting pulses within a determined and fixed range of magnitude, and means for varying the amplification of said amplifier, thereby varying the range of magnitudes of pulses represented in said indicator.

2. In an instrument for analyzing radiation consisting of individual rays succeeding each other, said rays having different energy values, a detector responsive to said radiation for producing a succession of pulses coincident with said rays and having magnitudes representing the respective energies of said rays, a variable amplifier connected to said detector variably amplifying said pulses, a pulse discriminating network connected to said amplifier for selectively transmitting the amplifier pulses in a definite relation to their magnitudes, means for varying the amplification of said amplifier, and an indicator responsive to the output of said pulse discriminating network and operated in accordance with the variation of said amplification for providing an indication of said energy values.

3. In an instrument for analyzing radiation consisting of individual rays succeeding each other, said rays having different energy values, a detector responsive to said radiation for producing a succession of pulses coincident with said rays and having magnitudes representing the respective energies of said rays, an amplitude selective network connected to the output of said detector, for selectively transmitting pulses in a definite relation to the amplitudes of said pulses, said network being of a pass band type and characterized by a mean height of the pass band determining the average magnitude of the impulses transmitted and by a width of the pass band determining the range of magnitudes transmitted, means for varying the mean height of said pass band and simultaneously varying the width of said pass band in order to maintain a predetermined functional relationship between said mean height and said width.

4. In an instrument for analyzing radiation consisting of individual rays succeeding each other, said rays having different energy values, a detector responsive to said radiation for producing a succession of pulses coincident with said rays and having magnitudes representing the respective energies of said rays, a variable amplifier connected to said detector for variably amplifying said pulses, a pulse discriminating network connected to said amplifier for selectively transmitting the amplified pulses in a definite relation to their magnitudes, and a scanning means operative to vary the amplification of said amplifier and to produce an indication showing a relationship between said amplification and the output of said pulse discriminating network.

5. In an instrument for analyzing radiation consisting of individual rays succeeding each other, said rays having different energy values, a detector responsive to said radiation for producing a succession of impulses coincident with said rays and having magnitudes representing the respective energies of said rays, an amplifier connected to said detector for amplifying said pulses, a pulse discriminating network connected to said amplifier for selectively transmitting the amplified pulses in a definite relation to their magnitudes, means for varying the amplification of said amplifier, means for producing a signal representing the degree of amplification of said amplifier, and means for producing a compound record of said signal and of the output of said pulse discriminating network.

6. In an instrument for analyzing radiation consisting of individual rays succeeding each other, said rays having different energy values, a detector responsive to said radiation for producing a succession of pulses coincident with said rays and having magnitudes representing the respective energies of said rays, a controllable amplitude selective circuit connected to said detector for transmitting impulses larger than M and smaller than N, where M and N are magnitudes determined by the parameters of said circuit, whereby said circuit is adapted to transmit pulses of an average height $A = (N+M)/2$ and average width $\Delta A = N - M$, and means to vary the parameters of said circuit whereby A covers a predetermined range of magnitudes and ΔA varies in a predetermined manner as a function of A.

7. In an instrument for analyzing radiation consisting of individual rays succeeding each other, said rays having different energy values, a detector responsive to said radiation for producing a succession of impulses coincident with said rays and having magnitudes representing the respective energies of said rays, a controllable amplitude selective circuit connected to said detector for transmitting impulses larger than M and smaller than N, where M and N are magnitudes determined by the parameters of said circuit, whereby said circuit is adapted to transmit pulses of an average height $A=(M+N)/2$ and of an average width $\Delta A = N-M$, means to vary the parameters of said circuit whereby A covers a predetermined range of magnitudes and ΔA varies in a predetermined manner as a function of A, and means responsive to said pulses and operated in accordance with the variation of said parameters for providing an indication of said radiation.

8. In an instrument for analyzing radiation consisting of individual rays succeeding each other, said rays having different energy values, a detector responsive to said radiation for producing a succession of impulses coincident with said rays and having magnitudes representing the respective energies of said rays, a controllable amplitude selective circuit connected to said detector for transmitting impulses larger than M and smaller than N, where M and N are magnitudes determined by the parameters of said circuit, whereby said circuit is adapted to transmit pulses of an average height $A=(M+N)/2$ and of an average width $\Delta A = N-M$, means to vary the parameters of said circuit whereby A covers a predetermined range of magnitudes and ΔA varies with A in such a manner that $\Delta A/A$ is substantially constant, and means responsive to said pulses and operated in accordance with the variation of said parameters for providing an indication of said radiation.

9. In an instrument for analyzing radiation consisting of individual rays succeeding each other, said rays having different energy values, a detector responsive to said radiation for producing a succession of impulses coincident with said rays and having magnitudes representing the respective energies of said rays, a controllable amplitude selective circuit connected to said detector for transmitting impulses having average value A and width ΔA, said values A and ΔA depending upon the parameters of said circuit whereby A covers a predetermined range of magnitudes and ΔA varies in a predetermined manner as a function of A, and means responsive to said pulses and operated in accordance with the variation of said parameters for providing an indication of said radiation.

10. In an instrument for analyzing radiation consisting of individual rays succeeding each other, said rays having different energy values, a detector responsive to said radiation for producing a succession of pulses coincident with said rays and having magnitudes representing the respective energies of said rays, a variable amplitude-selective network connected to said detector for selectively transmitting pulses in a definite relation to their amplitudes, said amplitude-selective network comprising an amplifier of variable amplification connected to the output of said detector and a pulse-discriminating network for selectively transmitting pulses within a determined and fixed range of magnitude, and means for varying the amplification of said amplifier, thereby varying the range of magnitudes of pulses represented in said indicator, and means operative simultaneously for providing indications respectively proportional to the output of said frequency-selective network and the gain of said variable-amplification amplifier.

References Cited in the file of this patent

UNITED STATES PATENTS

| | | |
|---|---|---|
| 2,661,419 | Tongue | Dec. 1, 1953 |
| 2,759,107 | Armistead et al. | Aug. 14, 1956 |
| 2,835,821 | Fearon | May 20, 1958 |